Figure 1:
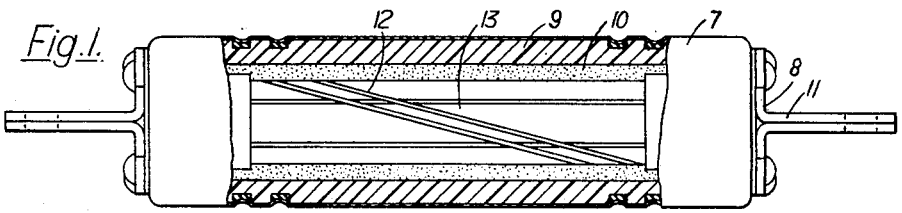

June 23, 1964   K. DANNENBERG ETAL   3,138,682
HIGH VOLTAGE ARC EXTINGUISHING ELECTRIC FUSES
Filed Nov. 23, 1960

*Inventor*
Kurt Dannenberg
Bruce Clifford Hicks
*By*
Watson, Cole, Grindle & Watson
*Attorney*

United States Patent Office
3,138,682
Patented June 23, 1964

3,138,682
HIGH VOLTAGE ARC EXTINGUISHING
ELECTRIC FUSES
Kurt Dannenberg and Bruce Clifford Hicks, London,
England, assignors to E.M.P. Electric Limited
Filed Nov. 23, 1960, Ser. No. 71,295
12 Claims. (Cl. 200—120)

The present invention relates to improvements in high-voltage electric fuses, i.e., fuses intended for system voltages above 600 volts, and particularly to current limiting high rupturing capacity fuses wherein one or more fusible elements is/are embedded in a powder filling consisting of quartz or other suitable material, and enclosed in an outer casing normally of a refractory material bearing suitable terminal means at the ends.

For certain important applications of such fuses, for example for the protection of high-voltage semi-conductor rectifier circuits, it is necessary to restrict the maximum arc voltage rise during clearance of heavy fault currents or short-circuit currents, to a value not greatly exceeding the normal operating voltage, that is, for example, 1.5 times the crest of the rated system voltage, or less which was hitherto not obtainable with high voltage current-limiting fuses. To some extent these requirements are mutually contradictory with other requirements which such fuses must fulfill, since short circuit fault clearance requires relatively long fusible elements in the case of high voltage fuses and the relatively great length tends to increase the arc voltage. It has not heretofore been possible to provide a current limiting fuse with the ability to secure current cut-off and associated appropriate speed of operation with large and small values of fault current, coupled with extreme restriction of the maximum arc voltage specified above, so that no unduly high voltage stress is imposed on the apparatus to be protected at the moment of interruption of the circuit under fault conditions. Furthermore, for certain applications the current limiting action should be ensured at relatively lower fault current values than can be secured with known fuses.

As already indicated these requirements are particularly important in the case of recently developed power current semi-conductor devices such as germanium and silicon power rectifiers. Such rectifiers are commonly employed in a bridge circuit and each rectifier in such a circuit should be protected by a fuse but the maximum arc voltage on occurrence of a fault must be held at a low figure to minimise damage to the rectifiers. Further, in the event of an output circuit fault or in the event of a breakdown in any of the rectifiers the circuit must be interrupted before the rectifiers are damaged in the case of an external fault, or before any of the rectifiers other than the faulty one are damaged in the case of a breakdown in one of the rectifiers. On occurrence of a fault the circuit should, however, preferably be interrupted with a current limiting action in less than one half cycle even for moderate values of fault current, and furthermore the rate of current decrease during the arcing period should nevertheless not be such that high voltages are induced which would cause damage to any other rectifier in the bridge system.

A more specific object of the present invention is to provide a fuse capable of giving protection to high-voltage apparatus, and specifically to power rectifiers, having regard to the somewhat stringent specification conditions encountered in such cases.

An important advantage of the present invention as applied to the protection of power rectifier circuits is that, since the specification requirements can be fulfilled in the manner later described, it becomes possible to up-rate the rectifier elements to an appreciable extent because at present the rating of such rectifiers is partly determined by the availability of protective equipment capable of adequately protecting the rectifiers in the event of external fault conditions or of breakdown of one rectifier in a bridge system. The protection secured by this invention limits the voltage and thermal stress on the rectifier and permits the use of an increased percentage of the maximum possible rating of the rectifier. It should be noted here, however, that the benefit of arc-voltage restriction secured by the present invention is not limited in scope to power rectifier circuits, but is of great value in other high-voltage alternating current circuits.

In accordance with the present invention an electric fuse of the character referred to includes a fusible strip element having at least one section of progressively reduced cross sectional area. This result may be obtained by using a fuse strip of graded width, or thickness. Two portions of the fuse strip may be cut away to trapezoid shape with the smallest width portions abutting, or it may be regarded as comprising concave or triangular indentations at one side or each side, the base length of the concave area or triangle being much greater than its height. These sections will, in general, be symmetrical and therefore of double concave formation. There is also at least one section of uniform cross section or width, and at least one infusible or refractory element surrounding part of the latter section, the remainder of said section and the double concave or graded width section being surrounded by and in contact with the arc-extinguishing powder medium.

In practical constructions the present invention comprises essentially a fuse strip having at least two portions of graded width or thickness and at least one portion of uniform width or thickness positioned between the graded width of thickness portions and said graded width or thickness portions involve a progressive reduction in cross-sectional area to a minimum value followed by a progressive increase in cross-section to a value equal to that of the uniform width or thickness portion. In all cases the grading in the width or cross-section represents a progressive reduction and a progressive increase in cross-section, the change in cross-section being uniform or nearly uniform. In the case of a graded width portion this result may be secured by a double tapering configuration from one or both edges to give either a triangular indentation or a progressively curved indentation on a curve representing a portion of a circular arc. The same effect of grading in width may be obtained by means of a lozenge-shaped aperture in the strip.

Figure 5:
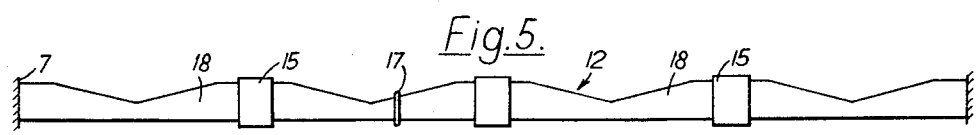
Figure 6:
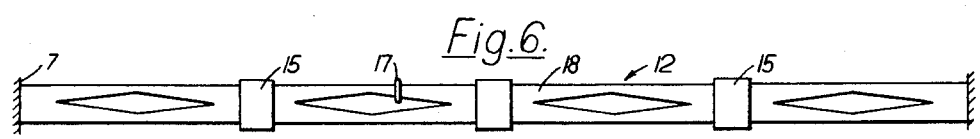
Figure 7:
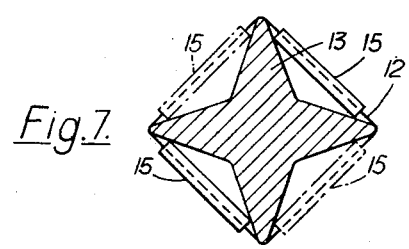

The features of the present invention are shown by way of example on the accompanying drawings in which:

FIG. 1 illustrates a high voltage current-limiting electric fuse to which the fuse strips of the present invention may be applied, FIGS. 2 to 6 are diagrammatic views illustrating various forms of fuse strip according to the invention; and FIG. 7 is a section through a ceramic fuse core provided with fuse strips according to the invention.

The fuse shown on FIG. 1 of the drawings comprises an outer casing 9, preferably of ceramic material, housing a star-shaped ceramic core 13 around which one or more fuse strips 12, as described hereinafter, are wound helically. End caps 7 attached to the case 9 carry terminal plates 8 to which, if desired, connection blades 11 may be attached, the terminal arrangements varying, of course, according to the type and application of the fuse.

The casing 9 contains a filling of arc-extinguishing powder 10 surrounding the core and the fuse strips wound thereon but the powder filling is prevented from coming into contact with sections of the strip or strips 12 by means of one or more ceramic elements or beads 15 fitting around the strip in the manner hereinafter described and serving as arc barriers.

Each fuse strip 12 comprises at least two portions 14 of graded cross-sectional area, and at least one portion 18 of uniform cross-sectional area, the portion 18 being placed between the portions 14. Uniform cross-sectional portions 18 may be provided on each side of the graded area portions 14, and where there are more than two such portions 14 adjacent pairs are separated by uniform section areas 18. There may be one or more fuse strips 12 and where more than one are provided they may all be identical or they may have slightly different operating properties.

The ceramic elements or beads 15 are placed upon or around part of the uniform cross-section portions 18, and these elements or beads 15 may be arranged to lie between the ribs of the core 13 so as to assist in locating and supporting the elements or beads 15 on the strips 12.

Figure 2:
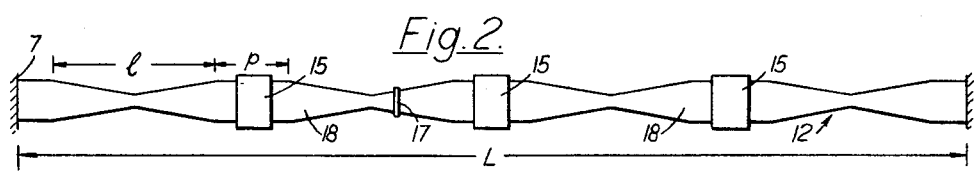

The graded cross-section areas 14 are formed in the embodiment shown on FIG. 2 by indenting the two side edges of the strip at opposite points in such manner as to secure a progressive and uniform or nearly uniform change in cross-section involving initially a reduction of the cross-section to a minimum value at the centre of the length of the indentation followed by a rise in cross-section on the opposite side of said minimum point. The indentations referred to may be of triangular form as shown on the drawings or they may be uniformly curved along a circular arc.

Figure 3:
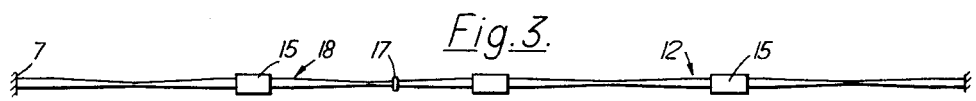

As shown in FIG. 3 the graded cross section areas 14 are obtained by a progressive change in thickness of the fuse strip 12, and as shown, the fuse strip comprises a plurality of graded cross-sectional area portions and a plurality of uniform cross-sectional area portions each provided with a ceramic element or bead 15.

Figure 4:
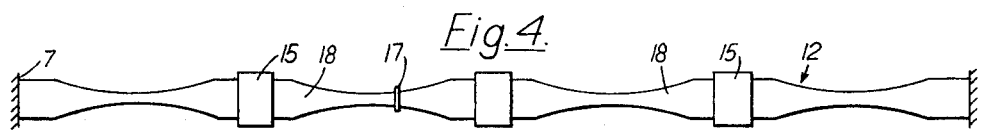

FIG. 4 illustrates another form of the fuse strip 12 where each indentation is formed by an arcuate depression. Thus, whereas in FIG. 2 the indented portion is formed by straight side portions running to a minimum cross-sectional area and then followed by a change in direction, in the case of FIG. 4 there is a progressive change in width throughout.

As shown in FIG. 5 the graded cross-section areas may be obtained by indentation from one side only as shown at 14 while as shown in FIG. 6 the same result may be obtained by means of a lozenge-shaped aperture 16 in the strip 12.

The ceramic elements or beads 15 are placed upon the uniform cross-sectional areas 18 as indicated for example on FIGS. 2 to 6.

If desired and to secure desired operating properties a portion of low melting point metal 17 may be placed in heat-transferring relation to the fuse strip 12, and preferably in physical contact therewith. These elements 17 may be placed at a suitable position of the graded cross-sectional portions 14, preferably comparatively close to the minimum width part thereof.

The graded cross-section parts 14 are accurately proportioned to secure correct operation and are preferably of symmetrically tapering form on the two side edges of the strip and taper symmetrically in relation to the central, minimum-width part of each section and to the longitudinal axis of the strip. In many cases the additional alloying metal 17, which may be in the form of a small bead, may be placed at a suitable point of the graded cross-section parts 14 comparatively close to the minimum-width part thereof. The fusible strip or strips 12 consists of high conductivity metal such as copper or silver and the alloying metal may consist of tin or a tin-bearing material such as solder.

The dimensions of the ceramic element or elements 15 and their positioning are also significant as controlling the operation of the fuse, and they may be selected as hereinafter explained. The selected positions of these elements is retained by arranging for them to lie between adjacent ribs on the core 13 (see FIG. 7) when the strip or strips 12 is/are placed in position. Further, the strip or strips 12, being embedded in arc quenching powder, but being in part protected from the action of the powder during fuse operation by the ceramic element or elements, may be regarded as divided into three operative sections; two double concave parts in contact with arc quenching powder, a parallel-sided section in contact with arc-quenching powder, and short sections not in contact with the powder but surrounded by ceramic elements.

It may be said that of the three sections of the fuse strip, the graded cross-section parts 14 represent the arc initiation area and regulate the rate of fusing, the length of the arc, and the speed of interruption by the particular shape and reduced cross-section of the strip; the minimum fusing characteristics may be assisted by the placing of alloying material in heat-transferring contact with the fuse strip near the minimum width section of the graded sections 14 and the portion enclosed by the ceramic elements isolates part of the strip intentionally from the surrounding arc extinguishing powder form arc barriers under overcurrent fault conditions and assist arc voltage control under fault conditions upon operation of the fuse. The three sections together provide the required operational characteristics and permit by appropriate design and construction reduction in the total length of the fusible element otherwise determined by the system recovery voltage so that the maximum arc voltage under any conceivable form of fault operation does not greatly exceed the normal voltage, for example does not exceed 1.5 times the crest of the rated system voltage.

The fusible strips 12 employed in accordance with the present invention may therefore be comparatively short and a further important feature of the invention is that adequate support of the fuse strip of strips is obtained by reason of the fact that the bead or beads 15 is/are lodged in the gaps between the projecting ribs of the ceramic core 13. These beads 15 may thus be comparatively massive and proportioned so that, allowing for the angularity of the fuse strip or strips relatively to the core, the fuse strip or strips is/are adequately supported. In some cases the length of the fuse strip or strips is such that considered relatively to the length of the core, it executes less than one complete turn in its helical positioning on the core.

The following explanation of the functions which may occur under operational conditions provides a basis for design, but the invention is not limited to operation of the fuse in the manner suggested hereinafter.

The narrowest region of the graded cross-section parts is the region where melting is initiated and controls the melting or cut-off current of the fuse under heavy fault or short-circuit conditions.

The melting of the graded cross-section parts 14 of the strip is progressive and controls the rate of increase of the resistance of the arc path, thereby limiting the initial rate of change of current during the arc extinction period. The angle or configuration of the sides of the cut-out or concave sections 14 to the rest of the strip is carefully selected to suit the required performance of the fuse, coupled with the size and position of the ceramic elements 15.

The length of the double cut-out or concave sections 14 is made sufficient to achieve finally a rise of resistance so that an insulation value which ensures arc extinction is obtained.

Under short-circuit conditions the uniform sections of the fuse strip are melted immediately following the melting of the graded or concave sections 14. The rate of growth of path resistance is now controlled by the ratio of that part of the element directly surrounded by the arc extinguishing powder to that part contained within the ceramic bead elements. By this means the progressive growth of path resistance is limited to a rate consistent with the limitation on maximum arcing voltage for which the fuse is designed.

By this physical means, a total arc length is achieved which will satisfactorily clear heavy short-circuit currents, but the rate of growth of the arc length and arc resistance is progressively controlled to limit the arc voltage.

In the design of fuse strips to meet specific requirements the following factors should be taken into account:

If A is the cross-sectional area of the fuse strip at the uniform section portions 18, L the total length of the fusible element, $l$ the total length of the graded cross-section portions of the fuse strip and P the length of the uniform section portions 18, the following conditions should apply:

(1) $l$ should not be less than 0.3L,
(2) Over the graded cross-section portions the average modular rate of change of cross-sectional area with respect to the length of said areas $$\left(\frac{\delta A}{\delta l}\right)$$

may vary between 1% and 10% for each mm. of length of said length $l$.
(3) The total length of the fusible element covered by the ceramic element or elements 15 should lie between 0.1P and 0.7P.
(4) As regards the total number of ceramic elements 15 to be used, one such element should be employed for voltage ratings up to 5 kv. and for higher voltage ratings there should be one bead for every 5 kv. of rating.

What we claim is:
1. A high voltage electric fuse comprising an outer casing, an arc extinguishing powder filling in said casing, terminal caps on said casing and a fusible element embedded within the arc extinguishing powder in said casing extending from one end cap to the other, said fusible element including several sections of uniform cross-sectional area, a ceramic element surrounding part of each said uniform cross-sectional area section to form a plurality of arc barriers, and interposed sections of progressively varying graded cross-sectional area in contact with the arc extinguishing powder filling throughout, said sections being immediately contiguous one to the other in alternating arrangement, each section of graded cross-sectional area having a continuous and progressive change in cross section throughout its length from a maximum cross section at each end equal to the cross section of the contiguous section of uniform cross section, to an intermediate minimum cross section.

2. A high voltage fuse according to claim 1 wherein the portion of progressively varying cross-sectional area consist of a progressive change in width of the fusible element.

3. A high voltage fuse according to claim 1 wherein the portion of progressively varying cross-sectional area consist of a progressive change in thickness of the element.

4. A high voltage fuse according to claim 1 wherein the progressive change of cross-sectional area has on only one edge of the element a progressive reduction of cross-sectional area to a minimum value and a progressive increase from said minimum value to the cross-sectional area of the uniform cross-section portion.

5. A high voltage fuse according to claim 1 wherein said graded area comprises an indentation from both edges of the fuse strip to provide a configuration which is symmetrical about the minimum cross-section point and is symmetrical about the central longitudinal axis.

6. A high voltage fuse according to claim 1 wherein said graded area comprising an indentation formed by a triangular cut-out portion to provide a uniform progressive rate of change of cross-sectional area to a minimum value followed by an equal and opposite rate of increase of cross-sectional area to the maximum value corresponding to the cross-sectional area of the uniform width portions.

7. A high voltage fuse according to claim 1 wherein said progressive reduction in only one edge of the fuse element is of arcuate shape with a progressive rate of change from a maximum to a minimum figure followed by a progressive increase to the maximum figure corresponding to the cross-sectional area of the uniform width portions.

8. A high voltage fuse according to claim 1 wherein the progressive change of cross-sectional area consists of a lozenge-shaped aperture in the fuse element.

9. A high voltage fuse according to claim 1 wherein said outer casing further houses a ceramic star-shaped core and wherein a ceramic element surrounding said fuse element is lodged between rib portions of said core, the fuse element being positioned helically upon said core.

10. A high voltage fuse according to claim 1 wherein said fuse element comprises two portions of progressively varying cross-section formed by indentation from both edges of the fuse element to secure a gradual and progressive change of cross-sectional area, a uniform cross-sectional area located between said two portions, the cross-sectional area of said interposed portion being equal to the maximum cross-sectional area of said two portions and a ceramic bead surrounding part of said uniform cross-sectional area portion.

11. A high voltage fuse according to claim 10 wherein the total length of the said two portions is not less than 0.3 of the total length of the fuse element, wherein the rate of change of cross-sectional area in said two portions lies between 1% and 10% per mm. of length of said sections and wherein the length of the ceramic bead varies between 0.1 and 0.7 of the length of the interposed portion or of the total length of the portions of uniform cross-section.

12. A high voltage fuse according to claim 1 further comprising a portion of low melting point metal in heat-transferring relationship with said section of progressively changing cross-sectional area, said metal being capable of alloying with the fuse strip to secure predetermined operating properties.

References Cited in the file of this patent

UNITED STATES PATENTS

| | | |
|---|---|---|
| 1,277,045 | Cole | Aug. 27, 1918 |
| 1,428,768 | Fay | Sept. 12, 1922 |
| 1,774,252 | Bussmann | Aug. 26, 1930 |
| 1,907,740 | Clark | May 9, 1933 |
| 2,157,906 | Lohausen | May 9, 1939 |
| 2,157,907 | Lohausen | May 9, 1939 |
| 2,833,890 | Jacobs | May 6, 1958 |

FOREIGN PATENTS

| | | |
|---|---|---|
| 541,845 | Canada | June 4, 1957 |
| 775,977 | Great Britain | May 29, 1957 |
| 368,034 | Germany | July 29, 1935 |